US006973548B1

(12) United States Patent
Vartti et al.

(10) Patent No.: US 6,973,548 B1
(45) Date of Patent: Dec. 6, 2005

(54) DATA ACCELERATION MECHANISM FOR A MULTIPROCESSOR SHARED MEMORY SYSTEM

(75) Inventors: Kelvin S. Vartti, Hugo, MN (US); Ross M. Weber, Coon Rapids, MN (US); Mitchell A. Bauman, Circle Pines, MN (US); Ronald G. Arnold, Apple Valley, MN (US)

(73) Assignee: Unisys Corporation, Blue Bell, PA (US)

( * ) Notice: Subject to any disclaimer, the term of this patent is extended or adjusted under 35 U.S.C. 154(b) by 342 days.

(21) Appl. No.: 10/600,205

(22) Filed: Jun. 20, 2003

(51) Int. Cl.[7] .............................................. G06F 12/00
(52) U.S. Cl. ....................... 711/141; 711/143; 711/152
(58) Field of Search ................................ 711/118–160

(56) References Cited

U.S. PATENT DOCUMENTS

| | | | |
|---|---|---|---|
| 5,752,264 A | * | 5/1998 | Blake et al. ................. 711/144 |
| 6,092,156 A | * | 7/2000 | Schibinger et al. .......... 711/145 |
| 6,389,515 B1 | * | 5/2002 | Schibinger et al. .......... 711/141 |
| 6,738,872 B2 | * | 5/2004 | Van Huben et al. ......... 711/150 |
| 6,792,507 B2 | * | 9/2004 | Chiou et al. ................. 711/119 |
| 2001/0013089 A1 | * | 8/2001 | Wolf-Dietrich .............. 711/146 |

* cited by examiner

Primary Examiner—Brian R. Peugh
(74) Attorney, Agent, or Firm—Beth L. McMahon; Charles A. Johnson; Mark T. Starr (57) ABSTRACT

A dual-channel memory system and accompanying coherency mechanism is disclosed. The memory includes both a request and a response channel. The memory provides data to a requester such as an instruction processor via the response channel. If this data is provided for update purposes, other read-only copies of the data must be invalidated. This invalidation may occur after the data is provided for update purposes, and is accomplished by issuing one or more invalidation requests via one of the memory request or the response channel. Memory coherency is maintained by preventing a requester from storing any data back to memory until all invalidation activities that may be directly or indirectly associated with that data have been completed.

40 Claims, 3 Drawing Sheets

DATA ACCELERATION MECHANISM FOR A MULTIPROCESSOR SHARED MEMORY SYSTEM

RELATED APPLICATIONS

The following co-pending applications of common assignee have some subject matter in common with the current application:

Ser. No. 10/600,880 entitled "System and Method for Ensuring Memory Coherency within a Multiprocessor Shared Memory System that Provides Data Ownership Prior to Invalidation", filed on even date herewith, and incorporated herein by reference in its entirety.

Ser. No. 10/601,030 entitled "System and Method for Handling Memory Requests in a Multiprocessor Shared Memory System", filed on even date herewith, and incorporated herein by reference in its entirety.

FIELD OF THE INVENTION

The present invention generally relates to methods and apparatus for controlling a multi-processor shared memory system; and, more particularly, relates to an acceleration system and method that allows a copy of data to be acquired from a shared memory for update purposes before one or more read-only copies of that data have been invalidated.

DESCRIPTION OF THE PRIOR ART

Data processing systems are becoming increasing complex. Some systems, such as Symmetric Multi-Processor computer systems, couple two or more Instruction Processors (IPs) and multiple Input/Output (I/O) Modules to shared memory. This allows the multiple IPs to operate simultaneously on the same task, and also allows multiple tasks to be performed at the same time to increase system throughput.

As the number of units coupled to a shared memory increases, more demands are placed on the memory and memory latency increases. To address this problem, high-speed cache memory systems are often coupled to one or more of the IPs for storing data signals that are copied from main memory or from other cache memories. These cache memories are generally capable of processing requests faster than the main memory while also serving to reduce the number of requests that the main memory must handle. This increases system throughput.

While the use of cache memories increases system throughput, it causes other design challenges. When multiple cache memories are coupled to a single main memory for the purpose of temporarily storing data signals, some system must be utilized to ensure that all IPs are working from the same (most recent) copy of the data. For example, if a data item is copied, and subsequently modified, within a cache memory, another IP requesting access to the same data item must be prevented from using the older copy of the data item stored either in main memory or the requesting IP's cache. Additionally, if one IP updates a first, then a second portion of the memory, these updates must become visible to other IPs within the system in that order. This is referred to as maintaining cache coherency. Maintaining cache coherency becomes more difficult as more cache memories are added to the system since more copies of a single data item may have to be tracked.

One of the ways cache coherency is maintained is by invalidating old copies of data before data is provided to an IP. For example, assume a first IP requests a copy of data for update purposes, and another read-only copy of the data exists within the cache of a second IP. The read-only copy must generally be invalidated before a copy of this data is provided to the first IP. This ensures that an old copy of data is not used after the first IP has updated its new copy. One problem with this methodology is that is may take some time to invalidate the read-only copy, delaying processing activities of the first IP.

An alternative to imposing the foregoing limitation involves providing data to a requester such as an IP before older data copies have been invalidated. Some prior art systems have allowed this to occur while also maintaining coherency by utilizing an architecture that enforces ordered request and response processing. In these types of systems, a restriction is imposed whereby a memory request to invalidate a read-only data copy must be completed before the memory provides any data in response to a subsequently issued memory request. This restriction guarantees memory coherency is maintained. The request/response ordering is accomplished by virtue of the fact that the memory includes a single memory channel to handle both memory requests and memory responses.

The single-channel memory architecture discussed above limits memory throughput. This is because all requests and responses must be processed by the same logic. A more efficient approach utilizes a split-channel architecture that allows requests from the memory to be processed at the same time as the memory responds to requests from units within the system. However, prior art systems did not implement this methodology because of the challenges associated with maintaining memory coherency.

What is needed, therefore, if an improved system for supporting a split-channel memory architecture that includes dedicated request and response processing logic. The system preferably allows data to be acquired from memory before other read-only copies of the data are invalidated. The system must further ensure that memory coherency is maintained.

SUMMARY OF THE INVENTION

The current invention provides a memory system implementing dual request and response channels. The system allows memory data to be provided to a requester such as an IP for update purposes via the response channel before other read-only copies of that data that are stored elsewhere within the system have been invalidated. Invalidation of these copies is accomplished by issuing one or more invalidation requests via one of the request or the response channels. In one embodiment, the invalidation requests are issued via the response channel. Memory coherency is maintained by preventing the requester from storing any data back to memory until all invalidation activities that may be associated with that data have been completed.

As discussed above, the system includes a response channel that may be used to issue invalidation requests to invalidate read-only copies of data. An acknowledge tracker records when each of these invalidation requests has been completed. When every invalidation request associated with a particular data copy has been completed, an acknowledgement is issued to the requester. This acknowledgement indicates that all invalidation activities associated with the previously obtained data have been completed.

According to one aspect of the invention, memory coherency is maintained by tracking outstanding acknowledgement indications. When the memory returns data to a requester before invalidation activities for that data have been completed, a record is maintained for the request. That record is used to prevent the data from being returned to the memory until the invalidation activities have been completed.

According to one embodiment, a requester is a processing node that includes multiple IPs. When an IP attempts to write data back to memory, it is determined whether, at that moment in time, the IP initiated any requests for which data was returned, but for which acknowledgements are currently outstanding. The data will not be transferred to the memory until those acknowledgements are received, thereby preventing any possibility that incoherency will result. In another embodiment, the data transfer will be prevented until all acknowledgements outstanding at that moment in time have been received by the requester, regardless of which IP in the processing node issued the requests.

According to another aspect of the invention, the processing node includes a cache. Data may be stored to the cache by an IP within the processing node. When this occurs, a record is created of all outstanding acknowledgements existing at that moment in time for requests issued by predetermined ones of the IPs within the processing node. In one embodiment, the predetermined IPs include those IPs that accessed the data after it was obtained from memory. In another embodiment, the predetermined IPs include all IPs within the processing node. This latter embodiment may be employed in a system that does not track which IPs accessed the data.

The current invention prevents two updated portions of data from being transferred from a processing node to main memory in an order that is different from the order in which the updates were made, and at a time when an invalidation operation is pending on at least one of the data portions. If this situation were not prevented, another IP within the system may view the updates in an out-of-order manner, and may further initiate processing activities on one memory portion that is updated, and another portion that is outdated. Recall that this problem is a possibility because in a split-channel system, a response including updated data may be provided via the response channel in a manner that bypasses an earlier invalidation request queued to the request channel.

In one embodiment of the invention, a coherency system is provided for use in a data processing system that includes a memory coupled to a requester. The requester is capable of making a request to obtain data stored within the memory. The coherency system includes a request channel to issue one or more types of requests from memory to the requester. The coherency system further includes a response channel coupled to the request channel that is capable of providing the data to the requester before read-only copies of the data stored within the data processing system are invalidated.

According to another aspect of the invention, a method for maintaining coherency is described. The method may be employed within a data processing system having a memory including a request channel and a response channel. The method includes the steps of requesting data from the memory, and issuing one or more invalidation requests via one of the request or the response channel if one or more read-only copies of the data exist within the data processing system. The method further includes providing the data via the response channel to a requester that initiated the data request before all of the invalidation requests have been completed.

In still another embodiment, a system for maintaining memory coherency is disclosed. The system includes request means for issuing requests, and storage means for storing data. The storage means includes request channel means for issuing one or more requests to the request means, and response channel means for providing data to the request means in response to a request. At least one of the response channel means and the request channel means includes means for initiating invalidation of read-only copies of the data existing within the data processing system. The response channel means includes means for providing data to the request means before all of the invalidation requests are completed.

Other scopes, aspects, and embodiments of the current invention will become apparent from the following description and the accompanying drawings.

DETAILED DESCRIPTION OF THE DRAWINGS

Figure 1:
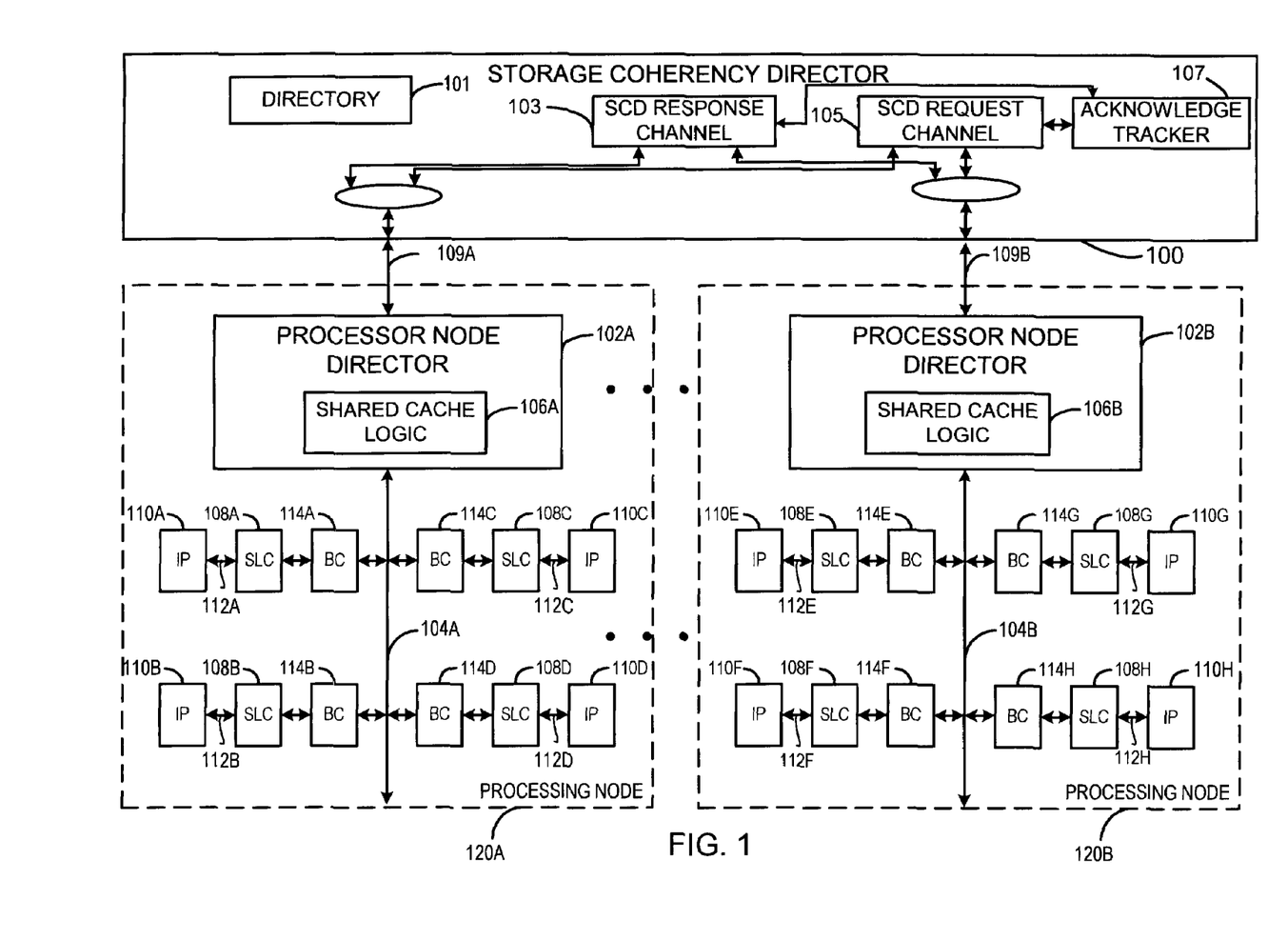
FIG. 1 is a block diagram of an exemplary data processing system of the type that may employ the current invention.

FIG. 1 is a block diagram of an exemplary data processing system that may employ the current invention. The system includes a Storage Coherency Director (SCD) 100 that provides the main memory facility for the system. SCD 100 may include random access memory (RAM), read-only memory (ROM), and any other type of memory known in the art. SCD 100 may be subdivided into multiple subunits (not shown) in a manner largely beyond the scope of the current invention. In one embodiment, SCD is a directory-based storage unit. In this embodiment, SCD retains information in directory 101 that indicates where the latest copy of requested data resides within the system. This is necessary since data from SCD 100 may be copied into any of the various cache memories within the system. Directory 101 tracks the latest copy of the data to ensure that every processor is operating from this copy. In the current embodiment, directory 101 includes a directory entry that tracks the location of each 128-byte block of memory within the SCD, where a 128-byte block is referred to as a cache line.

The SCD of the current embodiment includes a SCD response channel 103 and an SCD request channel 105. The SCD request channel 105 is coupled to an acknowledge tracker 107. The user of these channels and the acknowledge tracker is discussed below.

SCD is coupled to one or more Processor Node Directors (PND) shown as PNDs 102A and 102B. The system of the current invention may include more or fewer PNDs than are shown in FIG. 1. Each PND is coupled to SCD 100 over one or more high-speed SCD interfaces shown as interfaces 109A and 109B. Each of these interfaces includes data, address, and function lines.

Each PND includes logic to interface to the high-speed SCD interface, and further includes logic to interface to a respective processor bus such as processor buses 104A and 104B. Each PND may further include shared cache and all supporting logic, shown as shared cache logic 106A and 106B, respectively. This cache logic may include a Third-Level Cache (TLC), a Fourth-Level Cache (4LC), or some other type of cache memory.

As noted above, each of PNDs 102A and 102B is coupled to a respective processor bus 104A and 104B, which may utilize any type of bus protocol. Each processor bus further couples to multiple local cache memories through respective Bus Controllers (BCs) 114. Each BC controls the transfer of data between a processor bus and a respective one of the Second-Level Caches (SLCs) 108. In the current embodiment, Second-Level Caches (SLCs) 108A–108D are coupled to processor bus 104A through BCs 114A–114D, respectively. Similarly, SLCs 108E–108H are coupled to processor bus 104B through BCs 114E–114H, respectively. In another embodiment, these local SLCs may be Third-Level Caches.

Each SLC 108 is also coupled to a respective one of the Instruction Processors (IPs) 110A–110H over a respective interface 112A–112H. For example, SLC 108A is coupled to IP 110A via interface 112A, SLC 108B is coupled to IP 110B via interface 112B, and so on. An IP may be any type of processor such as a 2200™ processor commercially available from Unisys Corporation, a processor commercially available from Intel Corporation, or any other processor known in the art. Each IP may include one or more on-board caches. In the current embodiment, each IP includes a First-Level Cache (FLC). Preferably, each IP resides on a single Application Specific Integrated Circuit (ASIC) device with a respective SLC 108. Alternatively, an IP may be coupled to a respective SLC over an external interface. The associated BC may or may not be integrated with the SLC logic, and may also reside within the same ASIC.

A PND, its respective processor bus, and the entities coupled to the processor bus may be referred to as a "processing node". In the current example, PND 102A, processor bus 104A, and all entities associated with processor bus including BCs 114A–114D, SLCs 108A–108D, and IPs 110A–110D may be referred to as processing node 120A. Similarly, PND 102B, processor bus 104B, and all entities associated with processor bus 104B comprise a second processing node 120B. Other processing nodes may exist within the system, and are not shown in FIG. 1 for simplicity.

During execution, an IP is accessing programmed instructions and data from SCD 100 and its respective caches. For example, when IP 110A requires access to a memory address, it first attempts to retrieve this address from its internal cache(s) such as its FLC. If the requested address is not resident in the FLC, a request is sent to the respective SLC 108A. If the requested data is likewise not resident within the SLC, the SLC forwards the request to the processor bus 104A.

In one embodiment, all SLCs on a processor bus implement a snoop protocol to monitor, or "snoop", the processor bus for requests. In the current example, SLCs 108B–108D snoop the request that is driven onto processor bus 104A by BC 114A. If any of these SLCs has a modified copy of the requested cache line, it will be returned to requesting SLC 108A via processor bus 104A. Additionally, SLCs 108B–108D may have to invalidate any stored copies of the data depending on the type of request made by SLC 108A. This is discussed further below.

PND 102A also snoops the request from SLC 108A. In particular, PND 102A determines whether any other SLC responds to the request by providing modified data on processor bus 104A. If not, data that is retrieved from cache 206 of shared cache logic 106A is provided by PND 102A to SLC 108A.

In some instances, data requested by IP 110A is not resident within any of the cache memories associated with processor bus 104A. In that case, PND 102A must forward the request to SCD 100. SCD 100 determines the location of the current copy of the requested data using information stored within its directory 101. The most current copy may reside within the SCD itself. If so, the SCD provides the data directly to PND 102A. In one embodiment, this is accomplished via SCD response channel 103.

In some cases, request data is stored within another cache memory of a different processing node. In this instance, the way in which the request is handled depends on the type of request that has been made by IP 110A, and the type of access rights that have been acquired by the other cache memory. If IP 110A is requesting "ownership" of the data so that a write operation can be performed, and further if another processing node 120 currently retains ownership of the data, the SCD issues a port Snoop and Invalidate (S&I) request. In one embodiment, this type of request is issued via request channel 105, although in a different embodiment, this request may be issued on response channel 103. This request will cause the processing node to invalidate any stored data copies, and return updated data to SCD 100 so that this updated copy may be forwarded to PND 102A.

In another situation, the IP 110A may be requesting ownership of data that is retained by one or more other processing nodes 120 as read-only data. In this situation, an invalidation request is issued to these one or more processing nodes. The invalidation request causes the nodes to invalidate their copies of the data so that they may no longer be used. In a preferred embodiment, this type of request is issued on response channel 103. It has been found that by issuing invalidation requests on response channel 103, processing of requests issued by SCD 100 can be shared between the request and response channels, and throughput is optimized. In another embodiment, these requests may be issued on request channel 105.

In still another scenario, IP 110A may be requesting read-only access of data that is retained with ownership privileges by another node. In this case, SCD 100 issues a port snoop request. In one embodiment, this request is issued via request channel 105 to cause the other node to return any updated data copy to SCD. This type of request could be issued on the response channel 103 in an alternative embodiment. In a manner that is beyond the scope of the present invention, this processing node may, in some cases, retain a read-only copy of the data. In other cases, all retained copies are invalidated.

Any of the above-described request types may be issued by SCD 100 to a processing node or an SCD interface 109. Within a processing node, these requests are received by the respective PND 102. In one embodiment, this PND may determine, based on stored state bits, whether any of the SLCs 108 within the processing node stores a valid copy of the requested cache line. If so, a request will be issued on the respective processor bus 104 to prompt return of any modified data. Based on the scenario, this request may also result in invalidation of the stored copies, or the conversion of these copies to read-only data. Any updated data will be returned to SCD 100. These aspects of the system are largely beyond the scope of the current invention and are not discussed in detail.

As is discussed above, in the case where one PND such as PND 102A is requesting data for the purposes of performing updates, all other read-only copies of the data within the system must be invalidated. Otherwise, processors may utilize outdated copies of this data, causing data coherency problems. The SCD tracks that data invalidation has been completed as follows. First, the SCD issues an invalidation request to each of the processing nodes 120 in the system that retains a copy of the requested data, as described above. Since the system of the current invention may include more than the two processing nodes shown in FIG. 1, multiple invalidation requests may have to be issued. These requests are processed within the processing nodes in the manner discussed above. When a processing node has complete invalidation activities, it issues an invalidation acknowledgement to SCD via response channel 103.

Acknowledge tracker 107 tracks the processing of invalidation requests. Specifically, acknowledge tracker records every outstanding invalidation request that is issued for a given cache line. Each such request is matched to a subsequent invalidation acknowledgement. When acknowledge tracker determines that, for a given cache line, every processing node 102 that received an invalidation request has issued an invalidation acknowledgement to SCD, the invalidation operation is considered completed for that cache line.

In cases wherein one or more processing nodes 102 maintain read-only copies of requested data, SCD 100 retains the latest copy of this cache line. If a request is received for this data, the data could be provided directly to the requester even before acknowledge operations are completed. Even though this is theoretically possible, most prior art systems have not provided data to a requesting unit until the invalidation operations are completed because providing the data in this type of expedited manner could result in coherency problems.

One example of the type of coherency problems that may be caused by providing data prior to the completion of invalidation involves lock cells. A lock cell is a variable that is used to control a software-lock to an associated shared resource such as shared memory data. The state of the lock cell indicates whether the software-lock and the associated, protected shared resource is currently activated by a software process, or "thread", that is executing on another processor. Generally, a thread activates the software-lock using a lock-type instruction. As is known in the art, this type of instruction first tests the state of the lock cell. If the state of the lock cell indicates the shared resource is available, the instruction then sets the lock cell to activate the software-lock to the executing thread. These test and set functions are performed during an indivisible operation by a single instruction to prevent multiple processors from inadvertently gaining simultaneous access to the same lock cell.

The lock cell is generally stored within main memory. As noted above, this lock cell may be a software-lock associated with, and protecting, shared data. By software convention, the shared data must not be accessed without first gaining authorization through the software-lock. When the lock cell is acquired, the data protected by the lock cell may also be accessed.

From the foregoing discussion, it may be appreciated that if exclusive access is provided to one processing node on data that has not been invalidated by another node, a situation may arise wherein shared data may be accessed without adhering to appropriate lock convention. For example, assume the data is provided to PND 102A before a copy of this data is invalidated by the processing node of PND 102B. PND 102A updates the data, then updates the lock cell to a state that will allow PND 102B to re-gain access to the updated copy of the data. Both the lock cell and the updated data are flushed back to SCD 100. Assume processor 110E, which is executing a test-and-set instruction on the lock cell, gains access to this cell. However, because invalidation requests are not necessarily granted a priority level that is as high as other types of requests, the invalidation operation of the protected shared data has not been completed within SLC 108E and IP 110E's first-level cache at the time the lock cell has been acquired. As a result, processor 110E accesses the old copy of the protected shared data rather than obtaining the new data. Processing errors will result.

The types of processing errors described above would be avoided if the protected shared data were not provided to PND 102A until after completion of the invalidation operation for this data. For this reason, most prior art systems do not allow data to be provided to a requester before the invalidation operations are completed. Some prior art systems have maintained coherency while allowing data to be provided prior to the completion of invalidation operations by enforcing ordered request and response processing. This can best be understood by returning to the current example. Assume that an invalidation request is pending to PND 102B. This request must be completed before any subsequent response can be processed that will grant PND 102B access to a lock cell. In this manner, the outdated shared data copy is guaranteed to have been invalidated before PND 102B can acquire the lock cell. After the lock cell has been acquired, the updated data copy will then be obtained from SCD 100 and data coherency problems will be avoided.

Prior art systems enforce a request execution order by providing a single SCD channel to transmit requests and responses from SCD 100 to a PND 102. That is, in prior art systems, SCD response channel 103 and SCD request channel 105 would be replaced by a single channel. This ensures that an invalidation request provided to PND 102B is completed before SCD 100 grants PND 102B access to a lock cell.

In the current system shown in FIG. 1, a split response channel 103 and request channel 105 are provided. This split-channel configuration allows overall throughput to be increased, since more transmissions can be completed between SCD 100 and a PND 102 in a predetermined period of time. Moreover, higher priority data responses are allowed to by-pass lower priority invalidation requests, which can be beneficial in many circumstances. However, this by-pass capability results in the possible occurrence of the types of coherency problems discussed above.

The current invention provides a mechanism for maintaining coherency in a shared memory, multiple processor system that includes split request and response channels. The system includes a mechanism for tracking data within a PND 102 so that data provided to a PND 102 before one or more associated invalidation operations have concluded will not be written to the SCD until that operation is finally complete. This can best be understood by considering the following description and the accompanying drawings.

Figure 2:
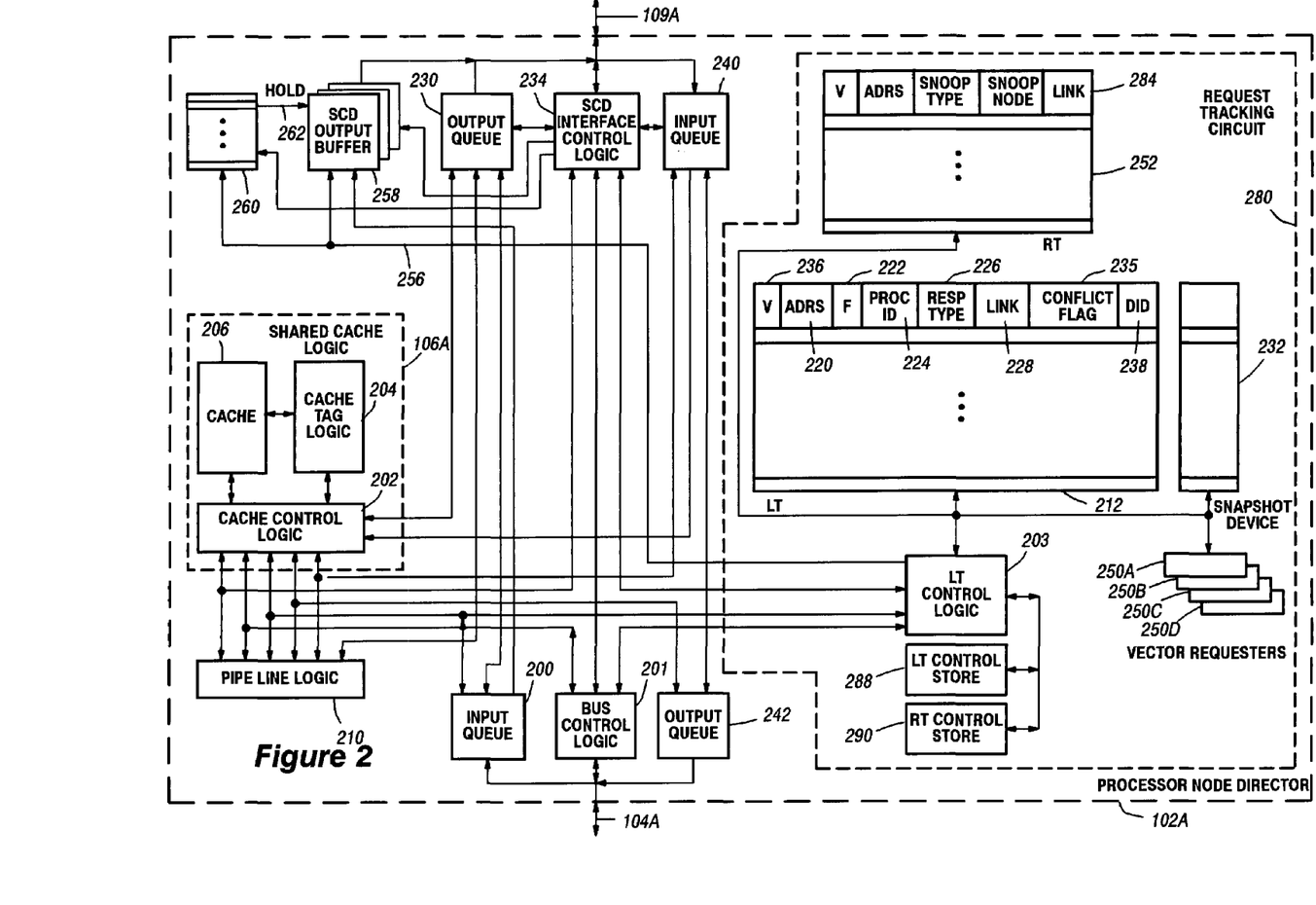
FIG. 2 is a block diagram of one embodiment of the current invention that is adapted for use within a data processing platform similar to that of FIG. 1.

FIG. 2 is a block diagram of logic within a PND 102 according to the current invention. Although PND 102A is shown and described, it will be understood that this discussion applies to any other PND as well. The logic of FIG. 2 includes a request tracking circuit 280 (shown dashed) that is provided to track outstanding invalidation operations so that data is not transferred from a PND in a manner that will cause memory incoherency.

This logic of FIG. 2 may best be understood by returning to the previous example. Assume that IP 110A acquires access to a lock cell associated with protected data. Thereafter, IP 110A makes a write request to the protected data. A cache miss results in SLC 108A, and a request is therefore issued on processor bus 104A to request the data. This request will cause in any other SLC on processor bus 104A to return any updated data copy to SLC 108A on the processor bus. If the request is for data ownership, it will also result in invalidation of any other copies retained by the SLCs of processing node 120A.

When the request is provided to processor bus 104A, it is also received by input queue 200 of PND 102A. In response, bus control logic 201 provides a request to pipeline logic 210, which, in turn, initiates a request to cache control logic 202 of shared cache logic 106A (shown dashed). If the requested data resides within cache 206, it will be retrieved so that it can be provided to SLC 108A if none of the other SLCs on processor bus 104A returns an updated copy.

Assume that in the current example, when the request is presented to cache tag logic 204, a cache miss results. This causes bus control logic 201 to issue a deferred response to SLC 108A if none of the other SLCs returns updated data on processor bus 104A. This deferred response indicates the data cannot be returned immediately. A request must then be issued to SCD 100 for return of the data.

Before a request for a cache line can be presented to SCD 100, cache control logic 202 forwards information associated with the cache miss to Local Tracker (LT) control logic 203. LT control logic creates a request entry for the request within a storage device referred to as Local Tracker (LT) 212. LT 212 includes multiple addressable entries shown as entries 0 through N. In one embodiment, LT 212 includes storage space for sixty-four entries, although an LT of a different size may be utilized as well. Each entry may be addressed using an index value. For instance, LT entry 0 is addressed using an index value of "zero", LT entry 1 is addressed using an index value of "one", and so on.

Each LT entry includes multiple fields. An address field 220 stores the request address. In the current embodiment, this address will identify a cache line of memory within SCD 100, wherein a cache line is an addressable contiguous memory portion containing 128 bytes. In another embodiment, any other contiguous portion of memory may be identified by the address. The LT entry further stores a function field 222 that identifies a request type. In this example, the request is a write request. Other types of requests may be tracked, as will be discussed below. Also included in an LT entry is a processor ID field 224 indicating which processor issued the request. In the current example, processor 110A is identified within this field. An additional response type field 226, which is initially left unused, is used to track request responses in a manner to be discussed below.

In addition to the above-described fields, each LT entry includes a link field 228 that is provided to link the current LT entry to any subsequently created entry associated with a request for the same cache line. In one embodiment, the link field may be set to the index value that identifies a latter-created LT entry, as will be described below. Requests are linked in this manner to order the requests for the same cache line according to time-order. If a request entry is already stored within LT 212 for a given cache line such that a linked list is created in this manner, LT will prevent the subsequent request from being issued to SCD 100. Thus, only one request for a given cache line will be pending to SCD at any given time.

Each LT entry further includes a conflict flag 235, which will be used in the manner discussed below to maintain memory coherency. In the current example, this flag is left unused. The LT entry further includes a deferred identifier (DID) field 238 that stores a deferred identifier. This identifier was provided by SLC 108A to PND 102A along with the initial request, and will be used to match the request to a response, as will be discussed below. Finally, each LT entry includes a valid bit in field 236 that is set when a valid entry is created within LT 212. This valid bit is cleared when the entry is later removed from the LT.

While a request entry is being created within LT 212, the request is transferred by pipeline logic 210 to output queue 230. A transaction identifier is included with the request. This transaction identifier is set to the index value for the LT entry that is tracking this request. This transaction identifier will be used to match a response from SCD 100 with the request information stored within LT 212, as will be described below. When the request gains priority, the request and transaction identifier are transferred via interface 109A to SCD 100 for processing.

After SCD receives a request, directory 101 is referenced to determine whether any of the one or more other nodes within the system stores a read-only copy of the requested data. If not, the requested data is provided to PND 102A along with the original transaction identifier and a response type of ownership-with-data. This response type indicates that data is provided with the response, and no invalidation response is outstanding for the current request. Because this response will not be followed by any subsequent action on the part of SCD 100, the transaction identifier is used to remove the request entry for the current request from LT 212. This is accomplished by clearing that entry's valid bit in field 236. The data returned from SCD 100 is provided to IP 110A, and may also be stored within shared cache logic 106A.

In another scenario, after SCD receives the ownership request, directory 101 indicates that a read-only copy of the requested data is retained by one or more processing nodes within the system. As a result, one or more invalidation operations must be performed. According to the current invention, rather than waiting for these operations to be completed, the data is provided immediately to PND 102A via SCD response channel 103 and interface 109A. SCD provides this data along with the original transaction identifier, and a response type of data-with-invalidate-pending, which indicates that the data is being provided before the invalidation operations have been completed. Also at approximately this time, SCD 100 issues invalidation requests. In one embodiment, these requests are issued via SCD response channel 103 to each of the one or more PNDs 102 that retains a read-only copy of the data. In this example, these PNDs will be assumed to include PND 102B and one other PND that is coupled to SCD 100 (not shown in FIG. 1).

During the time the invalidation requests are issued, PND 102A may receive the response, including the requested data, from SCD 100. This data is transferred from SCD input queue 240 to output queue 242 so that it can be forwarded to the requesting IP, which in this case is IP 110A. At this time, the IP gains ownership of the cache line and can proceed with read and/or write operations. This data is also provided to pipeline logic 210, which initiates a request to cache tag logic 204 to update the tag information and store the data within shared cache logic 106A. Finally, the transaction identifier provided with the response is used by LT control logic 203 to update the appropriate entry within LT 212. In particular, LT control logic 203 sets response type field 226 for that entry to indicate a response of data-with-invalidate-pending was received from SCD 100 for this request. IP 110A is now considered an invalidate-pending processor, since at least one valid entry is stored within LT 212 with a response type of invalidate-pending for IP 110A.

In addition to LT 212, the current embodiment provides several other storage devices to store information that is used to track invalidate-pending responses. These storages devices include vector registers 250A–250D. Each of these registers stores information associated with invalidate-pending responses that have been received for a respective one of IPs 110A–110D. For example, vector register 250A stores information associated with invalidate-pending responses that have been received as the result of requests issued by IP 110A, and so on. In the current example, vector register 250A is updated, since the current invalidate-pending response was received for a request issued by IP 110A.

The information stored within a vector register may be referred to as an "invalidate-pending" vector. This vector indicates which valid request entries exist that have a response type of invalidate-pending for IP 110A. For instance, assume that for IP 110A, the only valid request entry within LT 212 that includes a response type in field 226 of invalidate-pending is that entry that was created in the foregoing example. That is, no other request entry exists within LT 212 for IP 110A with field 226 set to invalidate-pending. Further assume that this request entry happens to be stored within the second entry of LT 212. The corresponding invalidate-pending vector will therefore indicate that the second entry of LT 212 is the only request entry that is associated with an invalidate-pending response for IP 110A. If any other request entry having a response type of invalidate-pending existed for IP 110A within LT 212, the additional LT entry will also be identified by the invalidate-pending vector.

In one embodiment, each invalidate-pending vector is a master-bitted vector that contains the same number of bits as there are storage locations within LT 212. Each of these bits corresponds to a respective one of the LT storage locations. In this particular embodiment, a first bit of the invalidate vector may correspond to the first LT storage location, and so on. Therefore, in the current example, a invalidate vector may be created having the second bit of the vector set to indicate that request entry in storage location "two" of LT 212 has a response type of invalidate-pending. All other bits in the vector are cleared in this example. Other embodiments are, of course, possible, including an embodiment that utilizes encoded values to record the invalidate-pending responses.

A invalidate vector is used to prevent data from exiting a processing node before all existing invalidate-pending entries that might be associated with that data have been cleared from LT 212. This will be discussed in detail below.

Assume that while PND 102A is processing the invalidate-pending response, invalidation requests have been issued to PND 102B and the other PND that retain read-only copies of the current cache line. Eventually PND 102B will complete its invalidation activities associated with this request, and an invalidation acknowledge will be issued by PND 102B on SCD response channel 103. Similarly, the other PND that is also performing an invalidation operation for this same cache line will complete invalidation activities and respond to SCD with an invalidation acknowledge. Acknowledge tracker 107 is tracking all outstanding invalidation activities for each cache line that was previously returned to a requester with an invalidate-pending response. Tracking is performed using the transaction identifier that is discussed above. In particular, acknowledge tracker 107 of the current example will determine when invalidation acknowledge responses have been returned from PND 102B, and from the other PND 102. When these two responses have been received, SCD request channel 105 issues an acknowledgement that is referred to as an invalidate-complete response. This response, which is sent via response channel 103 and interface 109A to SCD input queue 240 of PND 102A, includes the transaction identifier for the request.

When SCD input queue 240 receives the invalidate-complete response, it is provided to LT control logic 203 along with the accompanying transaction identifier. LT control logic utilizes the transaction identifier to address LT 212 and obtain the associated request entry, which will have a response type in field 226 of invalidate-pending. Because the outstanding invalidate-complete response has been received for this request entry, this request entry may now be removed from LT 212 by clearing the valid bit for that entry. Returning to the current example, this involves clearing the valid bit for the entry stored in LT location "two".

In addition to clearing the associated request entry within LT 212, LT control logic 203 also employs the invalidate-complete response to update the invalidate vectors. Specifically, the invalidate vectors are updated so they no longer track the invalidate-pending response recorded by LT entry "two". This can be best understood by considering the particular embodiment discussed above wherein master-bitted invalidate vectors are used to track the valid LT request entries that have a response type of invalidate-pending. Recall that using that embodiment in the current example resulted in the creation of an invalidate vector having bit "two" set to track the request in LT entry two. This vector was stored within vector register 250A for IP 110A, since IP 110A initiated the request that resulted in the invalidate-pending response. Now that the invalidate-complete response has been received for this request, the request entry does not need to be tracked. Therefore, LT control logic 203 used the transaction identifier of "two" to clear bit "two" of that vector within vector register 250A. Additionally, bit "two" is cleared in all other vectors stored within vector registers 250B–250D. This is necessary because these other invalidate vectors may have inherited the conflict recorded by vector register 250A, as will be discussed in detail below.

Finally, the invalidate-complete response causes LT control logic 203 to access a snapshot device 232. The snapshot device 232 is used to store snapshots of the vector registers 250A–250D. These snapshots are taken because certain data transfer operations have occurred within the processing node, as is discussed below. It is sufficient at this point to note that LT control logic 203 employs the transaction identifier of the invalidate-complete response to clear every record of the associated invalidate-pending response that may be stored within snapshot device 232. In one embodiment in which the snapshot device stores master-bitted vectors of the type stored within the vector registers, the transaction identifier is used to clear the respective bit for all vectors stored in the device. In the current example, the transaction identifier is used to clear bit "two" of every vector stored within snapshot device 232.

Requests to memory are tracked in the manner discussed above, using invalidate-pending responses, and subsequent invalidate-complete responses. The manner in which the tracking is affected by the various data transfer operations that can occur within a processing node are discussed in detail in the following paragraphs.

Write Back (WB) Operations

A Write Back (WB) operation involves transferring data from an SLC 108 to a PND 102 because that data is no longer needed by the associated IP 110. Returning to the current example, assume that the cache line discussed above has been provided to, and is still retained by, IP 110A. The invalidate-complete response for this cache line has not yet been received by PND 102A. At this time, SLC 108A transfers the cache line back to PND 102A during a WB operation that is initiated because IP 110A no longer requires access to the data. When this occurs, the cache line address and other information associated with the WB operation are originally stored within input queue 200 of PND 102A. Pipeline logic 210 initiates a request to cache control logic 202, which will, in turn, present the cache line address to cache tag logic 204. If cache tag logic 204 determines that a cache hit has occurred, the cache line data provided with the WB operation is stored within cache 206.

After the reference to shared cache logic 106A has been performed, cache control logic 202 provides the cache line address to LT control logic 203 along with an indication that a cache hit occurred. LT control logic 203 uses the cache line address to determine whether an "invalidation conflict" exists. An invalidation conflict exists if the invalidate vector for IP 110A indicates that an invalidate-complete response is outstanding on at least one request associated with IP 110A. IP 110A is the processor that is of interest in this example, since IP 110A updated the data and the associated SLC 108A initiated the current WB operation.

In one embodiment, invalidation conflicts are detected using the invalidate vector for IP 110A. That is, if at least one bit of the IP's invalidate vector is set, an invalidation conflict exists. If this is the case, this cache line will not be written back to SCD 100 at this time.

Assume, for example, that LT entry "two" still exists to record that an invalidate-pending response was received for this cache line, and that the associated invalidate-complete response has not yet been received. This entry will be reflected by the fact that the invalidate vector for IP 110A, which is stored within vector register 250A, is non-zero. Therefore, an invalidate conflict is said to have occurred for this operation. As a result, LT control logic 203 creates a special type of conflict entry within LT 212 for IP 110A that is differentiated from request entries by setting a conflict flag in field 235. This entry further includes address field 220, which stores the address of the cache line that was written to shared cache logic 106A. Processor ID field 226 stores an identifier indicating that IP 110A is the invalidate-pending processor. Link field 228 is used in the manner discussed above to link this entry to any future LT entry that is associated with the current cache line. Response type field 226 remains unused. Finally, a valid bit 236 is activated to indicate the LT entry is valid.

Recall that in this example, the original request entry for the cache line that is associated with the WB operation remains stored in LT entry "two" such that two LT entries now exist for the same cache line. In this special case scenario, link field 228 of the original request entry is set to point to the newly created conflict entry, since the two entries are tracking the same cache line.

The above example relates to the special case scenario wherein the WB operation is associated with a cache line address that is the same as an address recorded within a LT request entry. For this reason, the request entry is linked to the new conflict entry. It is important to note that even in the more general-case scenario wherein the WB operation is directed to a cache line that is not associated with an existing LT entry, an invalidate conflict would still exist because the invalidate vector for IP 110A is non-zero. In this more general case, a conflict entry is created within LT 232 in the manner discussed above, but this entry is not linked to any previously created request entry.

At the time the conflict entry is created within LT 212, LT control logic 203 also creates an entry within snapshot device 232. In one embodiment, snapshot device 232 contains the same number of storage locations as is provided by LT 212. When a conflict entry is created within a storage location of LT 212, an entry is created within the associated storage location within snapshot device 232. In the current example, assume that the conflict entry for the WB operation is created within the third storage location of LT 212. The corresponding snapshot entry is therefore created within the third storage location of snapshot device 232, and so on.

Each entry within snapshot device 232 stores a snapshot reflecting the state of one or more of the invalidate vectors. In the current example, IP 110A is considered the invalidate-pending processor. Therefore, the vector stored within vector register 250A is retrieved and stored within the third storage location of LT 212. Recall that this vector indicates which LT request entries exist at this moment in time for IP 110A having a response type of invalidate-pending in field 226. This vector therefore provides a snapshot of all invalidate-complete responses that must be received by PND 102A before the cache line identified by the associated LT entry "three" can be allowed to exit the processing node. In the current example, it will be assumed that only bit "two" is set in vector register 250A. This indicates that only LT entry "two" records a response type of invalidate-pending for IP 110A.

Assume that after the conflict entry has been created in LT 212 and snapshot device 232 in the manner described above, the outstanding invalidate-complete response for the LT entry stored in LT storage location "two" is received from SCD 100. This invalidate-complete response is provided by SCD input queue 240 to LT control logic 203 in the manner discussed above. The transaction identifier provided with the invalidate-complete response is used to locate the associated request entry within LT 212, and LT control logic 203 removes the associated request entry from LT by clearing the valid bit in field 236, as was previously discussed above. At this time, this request LT entry is automatically unlinked from the subsequently created conflict LT entry for the same cache line.

In addition to addressing LT 212, LT control logic 203 references all of the vector registers 250A–250D to update the stored vectors. As discussed above, the transaction identifier is used to clear the associated bit within all of the master-bitted vectors. Similarly, the transaction identifier is used to clear the associated bit in every vector stored within snapshot device 232, as is discussed above. In keeping with the current example, every bit "two" in each of the vectors is cleared to indicate that the invalidate-complete response for the second LT entry has been received.

In some instances, clearing a bit of a invalidate vector will leave all bits of a snapshot cleared for a given conflict entry. This indicates that all outstanding invalidate-complete responses tracked by that invalidate vector have been received. For example, in the current case, recall that the invalidate vector that was stored within entry "three" of snapshot device 232 as a result of the WB operation included only one activated bit "two", which was set to indicate that the invalidate-complete response for LT entry "two" was outstanding. Following receipt and processing of the current invalidate-complete response, bit "two" of this invalidate vector will be cleared, indicating that no invalidate-complete responses are outstanding for the associated cache line. As a result, LT control logic 203 will automatically clear the corresponding LT entry "three" within LT 212 by clearing the valid bit in field 236. Assuming no other LT entries exist for this cache line, the cache line may now be aged from cache 206 as the cache management algorithm dictates. Alternatively, the cache line may be returned to SCD 100 if another processing node requests access to the cache line.

The foregoing discussion assumes that when the WB operation is performed, a cache hit occurs to cache 206 of shared cache logic 106A. If this is not the case, a different procedure is employed to handle the WB operation. In this latter case, the data provided with the WB operation is transferred from input queue 200 to an available one of SCD output buffers 258 for temporary storage. In one embodiment, output buffers 258 include sixteen buffers, each capable of storing one cache line. Any other number and size of output buffers may be used in the alternative.

When the cache miss occurs, cache control logic 202 also provides the cache line address to LT control logic 203 along with an indication that a miss occurred. If a conflict is detected for IP 110A, as will occur in the current example because of LT entry "two", LT control logic 203 provides control signals on lines 256 to create an entry within output buffer registers 260. Output buffer registers 260 are used to manage any cache lines that are stored within SCD output buffers 258. In one embodiment, this group of registers includes a register that is respectively associated with each of SCD output buffers 258. For example, the first SCD output buffer may be associated with the first output buffer register, and so on. In the current example, LT control logic 203 creates an entry in whichever output buffer register corresponds with the SCD output buffer that stores the current cache line. This entry stores a copy of the invalidate vector for IP 110A, since IP 110A initiated the WB operation. This invalidate vector, which is copied from vector register 250A, provides an indication of which request entries stored within LT 212 for IP 110A having a response type of invalidate-pending. Recall that in the current example, bit "two" of this vector is set. As long as at least one bit remains set in this vector, a hold line will be asserted on interface 262 that prevents the data stored within the associated one of the SCD output buffers 258 from being transferred from PND 102A to SCD 100.

As described above, the invalidate-complete response associated with LT entry "two" will eventually be received from SCD 100. As a result, LT control logic 203 will clear bit "two" in all vectors stored within vector registers 250A–250D, and all vectors stored within all output buffer registers 260. This clears all bits in the vector that controls release of the current cache line, and therefore the hold line on interface 262 is deactivated. As a result, the cache line that is stored in one of SCD output buffers 258 will be written back to SCD 100 during a port memory write operation that is completed under the control of SCD interface control logic 234.

Processor Bus Write Back (PBWB) Operations

A Processor Bus Write Back (PBWB) is another type of data transfer operation that may be performed across processor bus 104A. Returning to the current example, assume that the current cache line still resides within SLC 108A for IP 110A. At this time, another IP such as IP 110B makes a request for the current cache line. BC 114A, which is snooping the bus, responds to this request by initiating an operation to invalidate the current cache line within SLC 108A. BC 114A then provides any updated copy of the cache line on processor bus 104A to IP 110B.

When BC 114A provides the updated copy of the cache line on processor bus 104A, this cache line is also stored within input queue 200 of PND 102A, and is forwarded to pipeline logic 210. Pipeline logic schedules a request to cache control logic 202 to determine whether the data is stored within cache 206. Cache control logic 202 also signals LT control logic 203 to determine whether any invalidate conflicts exist for the current cache line.

In one embodiment, LT control logic 203 has visibility as to which IP 110 received the data, which in this example is IP 110B. This processor becomes the new invalidate-pending processor for the cache line. In one embodiment, this results in IP 110B inheriting all of the invalidate conflicts existing for every other IP on processor bus 104A. In other words, all bits that are set within any of the other vector registers 250A–250D are copied into the vector register for the current invalidate-pending processor.

In the current example, and for simplicity, assume that there is only one entry within LT 212 having a response type in field 226 of invalidate-pending. This entry resides in LT location "two", as discussed above, and is reflected by a single bit "two" that is set within the invalidate vector stored within vector register 250A. No other conflicts are recorded within LT 212, as reflected by the fact that the vectors stored within vector register 250B–250D are all cleared. Therefore, when IP 110B inherits all conflicts from the other processors, LT control logic 203 effectively copies bit "two" from vector register 250A to the invalidate vector stored within vector register 250B. If other bits had been set in vector registers 250A, 250C or 250D, those bits would also be set in the invalidate vector for IP 110B.

The embodiment described above requires that when a PBWB operation occurs, the new invalidate-pending processor inherits all conflicts in the system. This embodiment is adopted in a system wherein the identity of the previous invalidate-pending processor is not visible to the PND 102A. That is, PND 102A does not know which IP responded to the request by IP 110B for the cache line. In an alternative embodiment in which PND 102A is aware of which IP previously held the cache line, either from information stored within cache tag logic 204 or from data provided on processor bus 104A, the new invalidate-pending processor would be required to inherit conflicts only from the previous invalidate-pending processor, rather than from all processors. Returning to the current example, if PND 102A was provided with information indicating IP 110A was the previous invalidate-pending processor that provided the current cache line, IP 110B would be required to inherit only those conflicts existing for IP 110A, instead of inheriting conflicts from every processor. This latter embodiment may allow fewer conflicts to be inherited for a given cache line, which may allow the cache line to be released from a processing node more quickly.

After the invalidate vector for IP 110B is updated, and if any conflicts are recorded within vector register 250B for IP 110B, LT control logic 203 references LT 212 to create a new conflict entry. The conflict flag in field 235 is set, and the processor ID in field 224 is set to indicate IP 110B is the invalidate-pending processor. Address field 220 is set to record the address of the cache line, thereby tracking the updated data stored to cache 206 as a result of the PBWB operation.

LT control logic 203 further creates an associated entry in snapshot device 232. This entry stores the vector that is copied from vector register 250B in the manner discussed above. The newly created LT entry will be cleared automatically when all bits of this vector are cleared by receipt of the corresponding invalidate-complete responses.

The above discussion relates to the case wherein the PBWB operation returns cache line data to PND 102A, and a hit to cache 206 results. In the case wherein a cache miss occurs but unused space exists within cache 206 such that a cache replacement operation can be performed, the cache line is stored within cache 206. Processing then proceeds as was discussed above for the PBWB cache hit scenario. That is, LT control logic 203 updates the invalidate vector for IP 110B, which is stored in vector register 250B. The updated vector reflects the fact that IP 110B has inherited conflicts from all other IPs 110A, 110C and 110D. If conflicts now exist for IP 110B, a new conflict LT entry is created for the PBWB operation, and the associated entry within snapshot device 232 copies the vector from vector register 250B. In another embodiment wherein it is known that IP 110A is the IP providing the data, IP 110B only inherits conflicts from IP 110A in the manner discussed above.

In yet another scenario, the PBWB operation results in a cache miss, and a replacement operation cannot be performed. In this instance, the data provided with the PBWB operation is transferred from input queue 200 to an available one of SCD output buffers 258 for temporary storage. Additionally, cache control logic 202 provides the cache line address to LT control logic 203 along with an indication that a miss without replacement occurred. The invalidate vector for IP 110B is updated so that conflicts associated with the other processors are inherited by IP 110B. In another embodiment wherein it is known that IP 110A is providing the current data, IP 110B only inherits conflicts from IP 110A in the manner discussed above.

Finally, LT control logic 203 copies the invalidate vector for IP 110B into the output buffer register 260 that corresponds with the SCD output buffer 258 that stores the current cache line. As discussed above, because at least one bit of this invalidate vector is set, a hold line on interface 262 prevents the cache line from being written back to SCD 100. When all invalidate-complete responses associated with the invalidate vector have been received, the hold line will be deactivated, and the data will be transferred to SCD 100.

SCD Port Snoop Requests

As discussed above, a SCD port snoop request is issued to a processing node to cause that node to return cache line data that was owned, and possibly updated, by the processing node. This type of request include snoop requests, which are issued to allow a node to retain a read-only copy of the data while returning any data updates made while that data was retained with ownership. These requests also include snoop-and-invalidate (S&I) requests, which are issued to cause a processing node to invalidate all copies of the data, and return any data updates to SCD 100. The following paragraphs will provide examples related to S&I requests, although the processing of snoop requests are accomplished in a similar manner.

In response to receiving a S&I request, the PND will determine whether any SLCs 108 on its processor bus 104 retains a copy of the cache line, and if so, will request the invalidation and return of the data. PND will likewise invalidate any cache line copy stored within cache 206. PND then forwards the data, including any updates, to SCD 100. However, PND 102 cannot respond to a SCD port snoop request in this manner if some, or all, of the IPs in the processing node are invalidate-pending processors. This is best understood by example.

Assume that IP 110A and SLC 108A still retains the copy of the cache line discussed above. The invalidate-complete response of the current example has not yet been received for this cache line. At this time, SCD 100 issues a S&I request to PND 102A requesting return of a cache line. The requested cache line may be the same, or a different, cache line for which the response is pending.

As discussed in the foregoing paragraph, it is possible in some cases for SCD 100 to make an S&I request for the same data for which an invalidate-complete response is pending. The reason this may occur involves the dual channel architecture employed by the current system. Specifically, the SCD ensures that any outstanding invalidate-complete response is always issued before a snoop request is issued for the same cache line. Therefore, in a system having a single SCD channel, the invalidate-complete response will always be received by a PND before any port snoop request is received for that same cache line. However, in a dual SCD system, an invalidate-complete response is issued on SCD response channel 103, whereas a snoop request for a cache line that is owned by a processing node is issued on SCD request channel 105. Therefore, it is possible for a previously issued invalidate-complete response to be bypassed by a snoop request for the same cache line. Therefore, the S&I request will be received at the PND before the invalidate-complete response. This is discussed further in the following paragraphs.

Returning to the current example, when the S&I request is received by PND 102A, it is stored within SCD input queue 240, and is later provided to output queue 242 of bus interface logic 205. This request eventually gains priority, and is issued onto processor bus 104A to determine whether any of the SLCs 108 stores an updated copy of the requested cache line. This request is also provided to pipeline logic 210, which generates a request to cache control logic 202 to determine whether the cache line resides within cache 206.

For discussion purposes, it will be assumed the S&I request is requesting the same cache line discussed in the above example, and for which an invalidate-complete response is still pending. It will further be assumed that SLC 108A retains a modified copy of the cache line. When a request is issued on processor bus 104A, SLC 108A provides the modified copy to PND 102A along with an indication that a "processor-bus-hit-with-modified-data" occurred. Further, assume that this cache line was not stored within cache 206 such that a cache miss occurred. Finally, assume the cache is full such that the returned data cannot be stored within the cache. Therefore, this data is transferred from input queue 200 to an available one of SCD output buffers 258.

In the meantime, it is determined whether any invalidate conflicts exist for this cache line. If an invalidate conflict does not exist, the data may be returned to the SCD without delay. However, if a invalidate conflict exists, LT control logic 203 stores an invalidate vector in the one of output buffer registers 260 that corresponds with the SCD output buffer that stores the current cache line. This vector tracks the conflicts that exist for the cache line. In one embodiment, the invalidate vector that is created for the current cache line is generated by "ORing" all invalidate vectors stored within vector registers 250A–250D in the manner discussed above. This is necessary in an embodiment wherein the identity of the processor that returned the data, which in this case is IP 110A, is not known to PND 102A. Therefore, the cache line stored within SCD output buffers 258 must inherit all invalidate conflicts from all processors in a manner similar to the way conflicts are inherited when PBWB operations are performed.

In an alternative embodiment, the identity of the IP providing the returned cache line is known to PND 102A. This may be so because identity information is returned on processor bus 104A along with the data, or because that identity information is tracked within cache tag logic 204. In that case, the invalidate vector employed in the current scenario need only reflect those conflicts already associated with the identified processor.

In the manner discussed above, eventually all invalidate-complete responses associated with the invalidate vector will be received by PND 102A. In the current example, this involves receiving the invalidate-complete response for LT entry "two". When this response is received, LT control logic 203 will clear the only bit activated within the invalidate vector stored within the output buffer register for the current cache line. The hold line on interface 262 will be cleared, allowing the current cache line to be transferred from the SCD output buffers 258 to SCD 100 under the control of SCD interface control logic 234.

The foregoing discussion relates to an SCD snoop request that results in a processor bus hit with modified data, and a miss to shared cache logic 106A when no cache replacement operation is possible. In another scenario, the SCD snoop request results in a processor bus miss but a hit to shared cache logic 106A. This hit indication is transferred by cache control logic 202 to LT control logic 203, which determines whether an invalidate conflict exists. If an invalidate conflict is not detected, the data is provided from shared cache logic 106A to SCD 100 without delay. Otherwise, LT control logic creates a conflict entry in LT 212 in the manner discussed above. This LT entry will be linked to any request or conflict entry associated with the same cache line. In the current example, the cache line associated with the current S&I request is assumed to be the same cache line associated with LT entry "two". The newly created conflict entry is therefore linked to request entry "two". Additionally, an invalidate vector is stored within the associated entry of snapshot device 232. In one embodiment, this vector is obtained by "ORing" the contents of all vector registers 250A–250D. In another embodiment that records the identity of the most recent IP to update the requested cache line, the invalidate vector is set to the invalidate vector for that identified IP.

In addition to creating a conflict entry in LT 212, an entry is created in a Remote Tracker (RT) 252. This storage device is used to track all SCD snoop requests that must be deferred because of invalidate conflicts in those situations wherein the requested cache line is stored within shared cache logic 106A. In one embodiment, RT 252 is capable of storing sixty-four entries, although any other storage capacity may be utilized in the alternative. A RT entry includes information provided with the SCD snoop request such as the cache line address, the snoop request type, and the identity of the processing node that initiated the snoop request. RT entry also includes a link field 284 to link the RT entry to additional entries within LT 212. This will be discussed further below. The information within the RT entry is largely beyond the scope of the current invention, and is not discussed further.

The newly created RT entry is linked to the LT conflict entry for this cache line by storing the number of the RT entry within link field 228 of the LT entry along with an indication that the linked entry is stored in RT 252 instead of LT 212.

In the current example, the invalidate-complete response for LT entry "two" will eventually be received. As described above, this will remove the request entry from LT, which will be unlinked from the conflict entry for this cache line. LT control logic 203 will also clear bit "two" of the invalidate vectors stored within vector registers 250A–250D and snapshot device 232. If this results in the clearing of any of the invalidate vectors stored within snapshot device 232, the associated conflict entry will be removed from LT 212. In the current example, this will result in removal of the most recently created conflict entry from LT 212. When this occurs, the RT entry will be unlinked from the LT entry.

For discussion purposes, it will be assumed that the RT entry is not linked to any further LT entries because link field 284 of the RT entry remains set to a default value. Since the RT entry is not so linked, it may be processed to complete the S&I request. According to one embodiment, the RT entry is removed from RT 252, and LT control logic 203 signals bus control logic 201 to re-issue the request for the cache line on processor bus 104A. Pipeline logic 210 will also initiate a request to cache control logic 202. These requests will result in a processor bus miss, and a hit to cache 206. LT control logic 203 will determine that all conflicts have been cleared for the current cache line, and the data from cache 206 will be forwarded to output queue 230 for transfer to SCD 100. This embodiment utilizes control mechanisms existing within the design to simplify return of the data to SCD 100. In another embodiment, the request need not be re-issued to processor bus 104A. Instead, removal of the RT entry may cause the cache line data to be provided directly from cache 206 to output queue 230.

In the foregoing paragraph, it was assumed that the LT request entry was linked to a single conflict entry, which in turn, was linked to an entry stored within RT 252. It will be understood that one or more PBWB or WB operations may occur prior to receipt of the S&I request, resulting in the creation of one or more LT conflict entries for the same cache line. These entries will be linked in the manner discussed above. Upon receipt of the S&I request, yet another conflict entry is linked to the RT entry in the manner discussed above. Thereafter, it is possible that a subsequent request for the cache line may be made by an IP within the processing node so that a WB or PBWB operation occurs. This will cause an additional conflict entry to be created within LT 212. In this case, a pointer field 284 in the RT entry is set to point to this new LT entry, which may, in turn, point to an additional LT entry, and so on. Thus, the sequence of entries for the same cache line may include multiple conflict entries. Because of SCD constraints dictating that, at most, one snoop request will be outstanding per cache line at any given time, this sequence will include, at most, one RT entry.

When an RT entry points to an LT entry, processing occurs generally as follows. When the RT entry is removed from RT 252, the cache line associated with the request is returned to SCD 100 in the manner discussed above. LT control logic 203 then unlinks the next LT conflict entry on the linked list by re-issuing a request for the cache line to processor bus 104A. A request for the cache line is also initiated by pipeline logic 210 to cache tag logic 204. Because the cache line was returned to SCD 100 during the previous transaction, these requests will result in a miss both to processor bus 104A and cache 206. As a result, the SCD will issue a retry response to processor bus 104A, causing this IP to make a request for this cache line at a later time. When this request is later issued, a request entry will be created within LT in the manner discussed above, and a request will be made to SCD for the cache line. This process effectively transfers the conflict entry into a request entry. More details about processing an extended list of LT entries are provided in commonly-assigned patent application entitled "System and Method for Handling Memory Requests in a Multiprocessor Shared Memory System", Ser. No. 10/601,030, filed on even date herewith, and referenced above.

The foregoing scenario discusses the case wherein a snoop request results in a processor bus miss and a cache hit 206. Similar processing will occur if a hit occurs to processor bus 104A, a miss occurs to cache 206, and the cache has storage space available to accommodate the storing of the data returned from processor bus 104A. In this case, the data is stored in cache 206, and LT and RT entries are created in the manner discussed above. When all associated invalidate-complete responses have been received, the LT and RT entries are removed from their respective storage devices, and the requested cache line is read from cache 206 to output queue 230 for transmission to SCD 100.

In yet other another case, the SCD snoop request will result in a processor bus hit with modified data, as well as a hit to shared cache logic 106A. In this scenario, if a conflict does not exist, the data within the cache is invalidated, and the data that is returned on processor bus 104A is forwarded to output queue 230 for transmission to SCD 100. If a conflict does exist, however, data returned from processor bus 104A is stored to cache 206. LT and RT entries are created in the manner discussed above. The cache line is returned to SCD 100 after all applicable invalidate-complete responses have been received.

Finally, in another scenario, both a processor bus miss and a miss to shared cache logic 106A may occur when the SCD snoop request is received. In this case, a snoop response is generated to SCD 100 indicating the cache line is no longer present within the processor node.

The above description considers a special case example wherein an S&I request is received from SND 100 for the same cache line that is already associated with a LT entry. This special case is considered to illustrate the manner in which linked lists of entries are created and handled. It will be understood, however, that similar processing steps are executed for S&I requests that request cache lines not associated with prior LT entries. That is, the same type of conflict processing as discussed above occurs, except that any LT conflict entry that may be created when updated data is stored to cache 206 as a result of the S&I request is not linked to a prior LT entry. This LT conflict entry will having a link field 228 that points to the RT entry in the manner discussed above. Processing of any data stored within MSU output buffers also occurs in the manner discussed above.

From the foregoing description, one skilled in the art may appreciate that LT 212 may become full or nearly full if a large number of requests are being provided or received by a processing node within a predetermined period of time. In one embodiment, when a predetermined number of entries have been created within LT 212, a hold line is asserted on interface 109A. This hold line prevents any further requests from being transferred to, or received from, SCD 100 until a predetermined number of entries are removed as the result of receiving corresponding responses from the SCD. When a predetermined number of locations are available within LT 212, the hold line is deactivated, and request processing continues in the manner discussed above.

The above discussion provides one exemplary embodiment of request tracking circuit 280. Those skilled in the art will appreciate that many alternative embodiments may be provided for this circuit. For example, LT 212, snapshot device 232, RT 252, and vector registers 250A–250D could be implemented using one, or any other number of storage devices. These storage locations need not be partitioned in the manner shown in FIG. 2. In addition, output buffer registers 260 could be included in these one or more storage devices.

Figure 3:
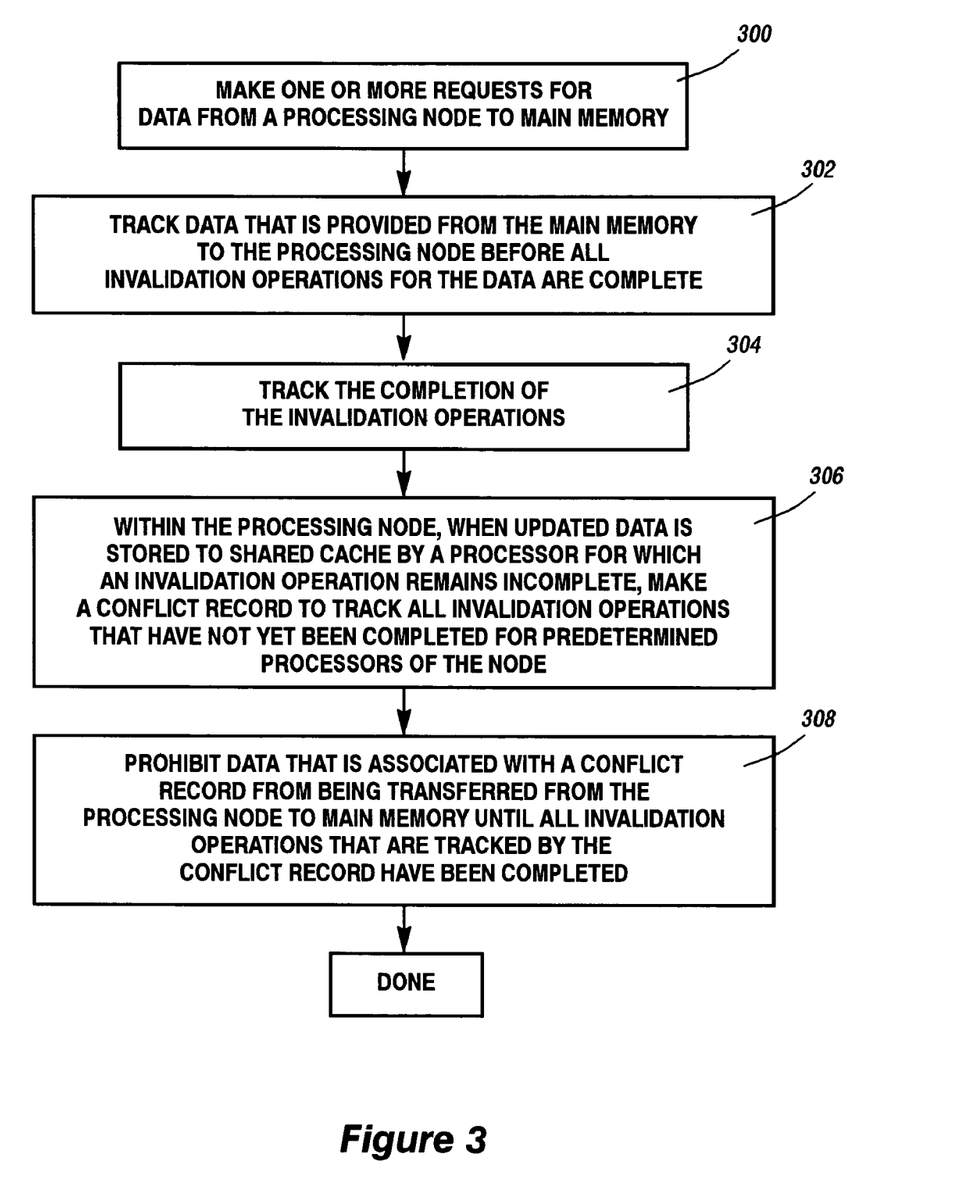
FIG. 3 is a flow diagram of one embodiment of a method according to the current invention.

FIG. 3 is a flow diagram of one embodiment of a method according to the current invention. In step 300, requesters make one or more requests for data to the main memory. Data is provided from the main memory in response to these requests. Any data that is provided before all associated invalidation operations have been completed is tracked by the requester (302). In one embodiment, this requester is a processing node 120 with multiple processors. However, this requester could be a single processor, or multiple processors coupled in a manner other than that shown in FIG. 1.

As invalidation operations are completed, as indicated by invalidate-complete responses issued by the main memory, these responses are tracked (304). Data received from the main memory may be updated. In one embodiment, one or more processors associated with each requester will perform these updates. When updated data is stored to a shared cache or another storage device such as an output buffer within the requester, and some invalidation operations associated with the processor storing the data have not been completed, a conflict record is created (306). This conflict record tracks invalidation operations that have not yet been completed at that moment in time for any data requested by predetermined ones of processors associated with the requester. In one embodiment, the predetermined ones of the processors include the processor that is storing the updated data, and further include the other processors from which the storing processor has inherited conflicts. In still another embodiment, the predetermined ones of the processors include all processors. Data associated with a conflict record is prohibited from being transferred from the requester until all invalidation operations that are tracked by the conflict record have been completed (308).

The above-described invention provides a system and method for preventing a cache line from being transferred from a first processing node back to SCD 100 before all conflicts associated with the cache line have been cleared. Specifically, by storing a invalidate vector within snapshot device 232 at the time a PBWB or WB operation is performed, a "snapshot in time" is captured for the cache line. When this snapshot is created, PND 102A enters a "watch mode" for the cache line. That is, the PND will not allow the associated cache line to exit the processing node until every invalidate-complete response associated with the snapshot has been received. This ensures that updates made by a first IP to multiple cache lines are not seen by another IP in an out-of-order manner. As discussed above, if this out-of-order access occurs, the types of coherency problems discussed above may occur. For example, access to a lock cell may be acquired before an old copy of data has been invalidated, resulting in an IP operating on this old data.

While various embodiments of the present invention have been described above, it should be understood that they have been presented by way of example only, and not as a limitation. Thus, the breadth and scope of the present invention should not be limited by any of the above-described exemplary embodiments, but should be defined only in accordance with the following claims and their equivalents.

What is claimed is:

1. For use in a data processing system that includes a memory coupled to a requester, the requester being capable of making a request to obtain data stored within the memory, a coherency system, comprising:

a request channel to issue one or more types of requests from memory to the requester; and a response channel coupled to the request channel that is capable of providing the data to the requester before read-only copies of the data stored within the data processing system are invalidated.

2. The system of claim 1, wherein at least one of the request and the response channels include circuits to issue one or more invalidation requests to invalidate the read-only copies of the data.

3. The system of claim 2, and further including a request tracking circuit coupled to record that an acknowledgement is pending for the request.

4. The system of claim 3, wherein the requester is capable of making multiple requests for data, and wherein the request tracking circuit includes storage locations to record, for each of the multiple requests, that an acknowledgement is pending.

5. The system of claim 4, and further including:
an output buffer to store data that is to be transferred from the requester to the memory; and
control logic coupled to the output buffer to prevent the stored data from being transferred until acknowledgements have been received for each of predetermined ones of the multiple requests for which acknowledgements are pending at the time the data is stored to the output buffer.

6. The system of claim 5, wherein the predetermined ones include all requests from the requester.

7. The system of claim 5, wherein the requester is a processing node having multiple processors, and wherein the predetermined ones include requests that were initiated by ones of the multiple processors that accessed the stored data within the processing node.

8. The system of claim 4, wherein the requester is a processing node having multiple processors and a cache, and wherein the request tracking circuit includes snapshot circuits to record if data is being stored to the cache by any of the multiple processors that issued at least one request for which an acknowledgement is pending.

9. The system of claim 8, wherein the request tracking circuit includes circuits to prevent the data stored to the cache from being flushed to the memory until acknowledgements that are pending at the time the data is stored have been received on all requests that were issued by the processor that storing the data.

10. The system of claim 8, wherein the request tracking circuit includes circuits to prevent the data stored to the cache from being flushed to the memory until all acknowledgements that are pending at the time the data is stored have been received on all requests that were issued by any of the multiple processors.

11. The system of claim 8, wherein the multiple processors are coupled to implement a snoop protocol, and wherein the snapshot circuits include logic to record when data is being stored to the cache as result of a snoop response at a time when an acknowledgement is pending for at least one request issued by any of the multiple processors.

12. The system of claim 11, wherein the request tracking circuit includes circuits to prevent the data stored to the cache from being flushed to the memory until all acknowledgements that are pending at the time the data is stored have been received on all requests that were issued by any of the multiple processors.

13. The system of claim 1, wherein the response channel provides the data to the requester, and further comprising an acknowledge tracker coupled to the request channel to determine when all of the read-only copies of the data have been invalidated, and to thereafter generate an acknowledgement to the requester.

14. A method for maintaining coherency in a data processing system having a memory including a request channel and a response channel, the method comprising:
a.) requesting data from the memory;
b.) issuing one or more invalidation requests via one of the request or the response channel if one or more read-only copies of the data exist within the data processing system; and
c.) providing the data via the response channel to a requester that initiated the data request of step a.) before all of the invalidation requests have been completed.

15. The method of claim 14, and further including:
d.) recording when the one or more invalidation requests have been completed; and
e.) issuing an acknowledgement to the requester indicating all invalidation requests have been completed.

16. The method of claim 15, and further including:
issuing multiple requests for data to the memory; and
repeating steps a.) through e.) for each of the requests.

17. The method of claim 16, wherein multiple requesters are coupled to the memory, and wherein the issuing of the multiple requests is performed by the multiple requesters.

18. The method of claim 16, and including tracking, for each of the multiple requests, whether an acknowledgment for the request is outstanding.

19. The method of claim 18, wherein the requester includes a cache, and further including recording, when data is stored to the cache, that acknowledgements for predetermined ones of the requests are outstanding.

20. The method of claim 19, and further including preventing the data that was stored to the cache from being transferred by the requester until all acknowledgements for the predetermined ones of the requests have been received.

21. The method of claim 20, wherein the predetermined ones of the requests include all requests for which acknowledgements were outstanding at the time the data was stored to cache.

22. The method of claim 20, wherein the requester includes multiple processors, and wherein the predetermined ones of the requests include all requests that are outstanding at the time the data is stored to cache, and that were issued by one or more of the multiple processors that accessed the data that was stored to the cache after the data was received from the memory.

23. The method of claim 18, and further including receiving a return request from the memory requesting return of data retained by the requester.

24. The method of claim 23, and including preventing the retained data from being returned to the memory until all outstanding acknowledgements for predetermined ones of the requests have been received.

25. The method of claim 24, wherein the predetermined ones of the requests include all requests for which acknowledgements that are outstanding at the time the return request is received.

26. The method of claim 24, wherein the requester includes multiple processors, and wherein the predetermined ones of the requests include all requests that are outstanding at the time the return request is received, and that were issued by one or more of the multiple processors that accessed the retained data after the retained data was obtained from the memory.

27. The method of claim 16, and further including:
scheduling data for transfer from the requester to the main memory;
delaying transfer of the scheduled data until acknowledgements that are outstanding at the time the data is scheduled on predetermined ones of the requests have been received.

28. The method of claim 27, wherein the predetermined ones of the requests include all requests from the requester.

29. The method of claim 27, wherein the requester includes multiple processors, and wherein the predetermined ones of the requests include requests from one or more of the multiple processors that accessed the scheduled data.

30. For use in a data processing system, a system for maintaining memory coherency, comprising:
request means for issuing requests; and
storage means for storing data, the storage means comprising:
request channel means for issuing one or more requests to the request means; and
response channel means for providing data to the request channel means, where at least one of the response channel means or the request channel means includes means for initiating invalidation requests to invalidate read-only copies of the data existing within the data processing system, and the response channel means including means for providing data to the request channel means before all of the invalidation requests are completed.

31. The system of claim 30, wherein the storage means further includes acknowledge tracker means for initiating sending of an acknowledgement to the request means when all invalidation requests have been completed.

32. The system of claim 31, wherein the request means includes request tracker means for recording when an acknowledgement is outstanding for a request.

33. The system of claim 32, wherein the request tracker means includes control means for preventing data from being transferred from the requester to the storage means when an acknowledgement is pending for any requests that are associated with the data.

34. The system of claim 33, wherein the associated requests include all requests pending at the time it is determined that the data should be transferred from the requester.

35. The system of claim 34, wherein the request means includes multiple processors, and wherein the associated requests include all requests pending at the time it is determined that the data should be transferred from the requester and that are requests issued by any of the multiple processors having access to the data while the data was retained by the requester.

36. The system of claim 32, wherein request means includes cache means, and wherein the request tracker means includes means for recording, at the time data is stored within the cache means, whether any outstanding acknowledgments exist for requests associated with the data.

37. The system of claim 36, wherein the requests associated with the data include all requests issued by the requester for which acknowledgements are outstanding.

38. The system of claim 36, wherein the request means includes multiple processors, and wherein the requests associated with the data include requests issued by ones of the multiple processors that accessed the data while the data was retained by the requester.

39. The system of claim 32, wherein the storage means issues return requests to the requester for return of data signals, and wherein the request tracker means includes means for preventing return of the requested data signals until all acknowledgments that are outstanding at that time are received.

40. The system of claim 32, wherein the storage means issues return requests to the requester for return of data signals, and wherein the request tracker means includes means for preventing return of the requested data signals until all acknowledgments that are outstanding at that time are received on requests initiated by processors that accessed the requested data signals.

* * * * *